US012613988B2

(12) United States Patent
Serbanati et al.

(10) Patent No.: US 12,613,988 B2
(45) Date of Patent: Apr. 28, 2026

(54) CONCEPT FOR HANDLING REQUESTS FOR DATA

(71) Applicant: Sony Group Corporation, Tokyo (JP)

(72) Inventors: Alexandru Serbanati, Stuttgart (DE); Thomas Carette, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 405 days.

(21) Appl. No.: 18/179,397

(22) Filed: Mar. 7, 2023

(65) Prior Publication Data

US 2023/0297713 A1      Sep. 21, 2023

(30) Foreign Application Priority Data

Mar. 15, 2022    (EP) ..................................... 22162186

(51) Int. Cl.
G06F 21/62        (2013.01)
G06F 16/28        (2019.01)

(52) U.S. Cl.
CPC ........ G06F 21/6227 (2013.01); G06F 16/285 (2019.01)

(58) Field of Classification Search
CPC .... G06F 21/6227; G06F 16/285; G06N 20/00
See application file for complete search history.

(56) References Cited

U.S. PATENT DOCUMENTS

| 10,296,848 B1 * | 5/2019 | Mars ..................... | G06F 18/217 |
| 10,771,392 B1 * | 9/2020 | Farrell .................... | H04L 67/14 |
| 11,222,276 B2 | 1/2022 | Trim et al. | |
| 2007/0219964 A1 * | 9/2007 | Cannon ............. | G06F 16/90335 707/E17.14 |
| 2010/0257351 A1 * | 10/2010 | O'Connor ............. | G06F 21/606 713/150 |
| 2016/0014140 A1 * | 1/2016 | Akireddy ................ | H04L 63/20 726/1 |
| 2018/0114100 A1 | 4/2018 | Desai et al. | |
| 2020/0117826 A1 * | 4/2020 | Lilly, Jr. ........... | G06F 16/24539 |

(Continued)

FOREIGN PATENT DOCUMENTS

WO        2021/138426 A1      7/2021

OTHER PUBLICATIONS

Modeling Trust Negotiation for Web Services (Year: 2009).*

(Continued)

*Primary Examiner* — Lynn D Feild
*Assistant Examiner* — Kelah Janae Mcfarland-Barnes
(74) *Attorney, Agent, or Firm* — XSENSUS LLP

(57)        ABSTRACT

Examples relate to a query handler apparatus, query handler method and corresponding computer program, and to a system comprising such a query handler apparatus. The query handler device comprises at least one interface configured to communicate with a requester device and with a plurality of data provider devices. The query handler device comprises processing circuitry configured to obtain a request for data from the requester device. The processing circuitry is configured to determine an access policy for the requester device. The processing circuitry is configured to forward the request with information on the access policy to the plurality of data provider devices, to instruct the plurality of data provider devices to provide the data to the requester device according to the access policy.

17 Claims, 5 Drawing Sheets

(56) References Cited

U.S. PATENT DOCUMENTS

| | | | | |
|---|---|---|---|---|
| 2020/0186515 A1* | 6/2020 | Bansal | .................. | G06F 9/5027 |
| 2020/0213416 A1* | 7/2020 | Carrier | .................... | H04L 63/02 |
| 2021/0126922 A1* | 4/2021 | Stokes | ................ | G06F 21/6227 |
| 2021/0174243 A1 | 6/2021 | Angel et al. | | |
| 2021/0232862 A1* | 7/2021 | Inoshita | .............. | G06F 18/2185 |
| 2022/0108226 A1* | 4/2022 | Yu | ........................... | G06N 5/04 |

OTHER PUBLICATIONS

Skogsrud et al., Modeling Trust Negotiation for Web Services (Year: 2009).*

Myers et al., "Efficient Hybrid Proxy Re-Encryption for Practical Revocation and Key Rotation", Indiana University, pp. 1-69.

Mo et al., "Privacy Preserving Average Consensus", Available Online at: http://www.cds.caltech.edu/~murray/preprints/mm14-cdc_s.pdf., 2014, 8 pages.

"Matter—the Foundation for Connected Things"; Matter Alliance; Retrieved from the Internet on Jan. 22, 2022, 5 pages.

Bawa et al., "Privacy-Preserving Indexing of Documents on the Network", Proceedings of the 29th VLDB Conference, Available Online at: http://infolab.stanford.edu/~bawa/Pub/ppi.pdf, 2003, 12 pages.

Ruan et al., "Secure and Privacy-Preserving Consensus", arXiv:1707.04491v4 [math.OC], Available Online at: https://arxiv.org/pdf/1707.04491.pdf, Dec. 21, 2018, pp. 1-14.

Lehmann et al., "Updatable Encryption with Post-Compromise Security", Conference paper First Online: Mar. 31, 2018, Available Online At: https://link.springer.com/chapter/10.1007/978-3-319-78372-7_22, pp. 1-41.

* cited by examiner

CONCEPT FOR HANDLING REQUESTS FOR DATA

CROSS-REFERENCE TO RELATED APPLICATION

This application claims priority to European Application No. 22162186.5, filed Mar. 15, 2022, the entire contents of which are incorporated herein by reference.

FIELD

Examples relate to a query handler apparatus, query handler method and corresponding computer program, and to a system comprising such a query handler apparatus.

BACKGROUND

Due to privacy reasons, companies active in the consumer electronics market (and specifically the home automation sector) are moving towards architectures that operate locally, without the need for cloud-based interaction. For example, this architecture is also employed by the Matter Alliance. This allows system vendors to guarantee that no private information from local data is leaked to the cloud.

The above architecture of the peripheral ecosystems may support all existing functionalities, with the exception of the following two for which cloud interaction is needed—firmware update, and remote control by the user (through the Internet). So, in this approach, if these functions are not implemented, then a device might operate for its whole life cycle without any Internet connection. In the case of products using advanced features that leverage AI (Artificial Intelligence), models may be installed from factory and operate exclusively on local data. But, as a consequence, the system vendor cannot use local data to train their AI models, and even if the vendor develops a better AI model independently (i.e., without data from the deployed systems, it would be difficult for the vendor to deploy the improved model to the edge.

There may a desire for providing an improved concept for devices that employ machine-learning models.

SUMMARY

This desire is addressed by the subject-matter of the independent claims.

Various examples of the present disclosure are based on the finding that, with the increase of the number of devices at the consumer's premises and enhanced possibilities of communication, the devices may gain access to large datasets on which to train ML models. To avoid a misuse of data, e.g., due to a device having a different privacy policy than other devices, a query handler is proposed that handles access to data, e.g., data that can be used for the training or improvement of machine-learning models being used for classification. This query handler acts as a mediator between a requester device (wanting access to the data) and data providers (having access to the data). It determines an access policy for the requester device, and the data providers can decide whether to provide the respective data to the requester device.

Various examples of the present disclosure relate to a query handler device for accessing data. The query handler device comprises at least one interface configured to communicate with a requester device and with a plurality of data provider devices. The query handler device comprises processing circuitry configured to obtain a request for data from the requester device. The processing circuitry is configured to determine an access policy for the requester device. The processing circuitry is configured to forward the request with information on the access policy to the plurality of data provider devices, to instruct the plurality of data provider devices to provide the data to the requester device according to the access policy. The use of a query handler provides a single instance for controlling access to the data, to avoid circumvention of access restrictions (such as the iterative recreation of a data index). The access policy is used to restrict the access of the requester device, to thwart or complicate misuse of data.

At consumer premises, machine-learning is often used for classification—e.g., of persons (is the person shown in an image a given person, or is the person a child or adult etc.), of situations (is a person interested in interacting with a device, is a packet being delivered etc.), of an activity (is a person actively working out, or just taking a relaxing walk). Accordingly, the data may be used to train a machine-learning model for classification purposes, and/or the data being requested may be data relevant with respect to machine-learning, e.g., data relevant for classification. For example, the request may include a reference to a classification result. The data being requested may be relevant for machine learning with respect to the classification result. This way, devices may request data to improve a machine-learning model with respect to a particular classification outcome.

There are different situations, where classification can be performed. For example, the data being requested may be sensor data or an abstraction of sensor data of at least one of an object, person, event, scene, activity, and act being classified.

To avoid requester devices requesting the data under different identities, thus circumventing the access control, the requester device may be authenticated vis-à-vis the query handler device. For example, the processing circuitry is configured to obtain authentication information from the requester device, and to determine the access policy for the requester device based on the authentication information. For example, for each requester device, an access policy may be stored and/or maintained by the query handler device.

Alternatively, or additionally, the access policy may be determined from information provided by the requester policy. For example, the processing circuitry may be configured to obtain information on a data processing policy of the requester device from the requester device, and to determine the access policy for the requester device based on the data processing policy of the requester device. For example, the processing circuitry may be configured to negotiate the access policy with the requester device, e.g., to find a compromise between the data processing policy imposed by the query handler device (or the data provider devices) and the data processing policy offered by the requester device.

To avoid data misuse, the amount of data a requester device can request may be limited, e.g., to thwart efforts of index building. Accordingly, the processing circuitry may be configured to impose rate limiting on requests from requester devices. For example, the rate limiting may be based on a number of requests per requester device in a pre-defined time interval or wherein the rate limiting refers to a scope of the requests per requester device across an index of possible classifications.

Various examples of the present disclosure relate to a system comprising the query handler device (introduced above) and the plurality of data provider devices. For example, each data provider device may comprise at least one interface for communicating with the query handler device and for communicating with the requester device. Each data provider may comprise processing circuitry configured to obtain the forwarded request with the information on the access policy for the requester device. The processing circuitry of the (or each) data provider device may be configured to provide, if the data requested is available at the data provider device and can be provided according to the access policy, the data to the requester device. In other words, depending on whether the data provider device actually has data relevant to the request, and depending on the access policy, it can provide the data (directly) to the requester device. For example, the processing circuitry of the (or each) data provider device may be configured to provide the data to the requester device without involving the query handler device.

In general, the data provider devices may be intermediaries between the requester device and the source of the data. While, in some cases, a data source may be part of the same device as the data provider, more generally, they may be treated as separate entities. For example, the at least one interface of the data provider device may be further suitable for communicating with one or more data source devices. The processing circuitry of the data provider device may be configured to obtain the data from the one or more data source devices. Thus, the data of the data sources may be made available to the requester device, according to the access policy.

In some examples, the processing circuitry of the data provider device is configured to obtain the data in encrypted form. Thus, the data may be protected from data breaches.

In some examples, the processing circuitry of the data provider device may be configured to decrypt or re-encrypt the data before providing the data to the requester device. This may enable providing the data such, that only the specific requester device can use it.

More generally, the processing circuitry of the data provider device may be configured to transform the data before providing the data to the requester device. For example, some privacy-preserving transformations (e.g., embeddings) may be applied on the data.

As outlined above, the machine-learning process being employed by the proposed concept is tailored to classification. For example, the processing circuitry of the data provider device may be configured to obtain the data with information on a classification result with respect to the data. For example, the request may include a reference to the classification result. The processing circuitry of the data provider device may be configured to provide the data based on a match between the information on the classification result included within the data and the information on the classification result included in the request. In other words, the data being provided may be requested based on a classification result of a classifier being applied on the data.

In some examples, the proposed system further comprises a plurality of data source devices. Each data source device may comprise at least one interface for communicating with at least one of the plurality of data provider devices. Each data source device may comprise processing circuitry configured to provide the data to the at least one data provider device.

To provide data that is relevant with respect to a particular classification, the source devices may classify the data first.

For example, the processing circuitry of the data source device may be configured to process the data using a machine-learning model, determine a classification of the data based on an output of the machine-learning model, and to provide the data to the at least one data provider device with information on the classification.

In some examples, the data sources devices may coordinate the classification among themselves, to improve the quality of the classification. For example, the classification may relate to at least one of an object, person, event, scene, activity, and act being represented in the data. The at least one interface of the (or each) data source device may be further suitable for communicating with one or more other data source devices. The processing circuitry of the (or each) data source device may be configured to coordinate the classification of the object, person, event, scene, activity, or act with the one or more other data source devices using a privacy-preserving coordination mechanism. In particular, the privacy-preserving coordination mechanism may be a privacy-preserving voting mechanism.

There are different mechanisms that can be used for such a coordination of classification results. For example, the privacy-preserving coordination mechanism may be based on at least one of homomorphic encryption, adding random noise and multi-party computation.

In some cases, the data source may act as requester device, e.g., to improve the quality of the machine-learning model being used by the data source device. For example, the processing circuitry of the (or each) data source device may be configured to request further data from the query handler device, and to train the machine-learning model based on the further data.

As outlined above, in some cases, the data being provided may be encrypted, e.g., by the data source device. For example, the processing circuitry of the (or each) data source device may be configured to encrypt the data before providing the data to the at least one data provider device.

In general, the data source devices may generate the data themselves, e.g., using sensor data of a sensor, such as a camera, depth sensor or microphone, of the data source device. For example, the at least one interface of the (or each) data source device may be further suitable for communicating with at least one sensor of the data source device. The processing circuitry of the (or each) data source device may be configured to determine the data based on sensor data of the at least one sensor of the data source device.

Some examples of the present disclosure relate to a corresponding query handler method for accessing data. The method comprises obtaining a request for data from a requester device. The method comprises determining an access policy for the requester device. The method comprises forwarding the request with information on the access policy to a plurality of data provider devices, to instruct the plurality of data provider devices to provide the data to the requester device according to the access policy.

Some examples of the present disclosure relate to a corresponding computer program having a program code for performing the query handler method, when the computer program is executed on a computer, a processor, or a programmable hardware component.

BRIEF DESCRIPTION OF THE FIGURES

Some examples of apparatuses and/or methods will be described in the following by way of example only, and with reference to the accompanying figures, in which.

DETAILED DESCRIPTION

Figure 1A:
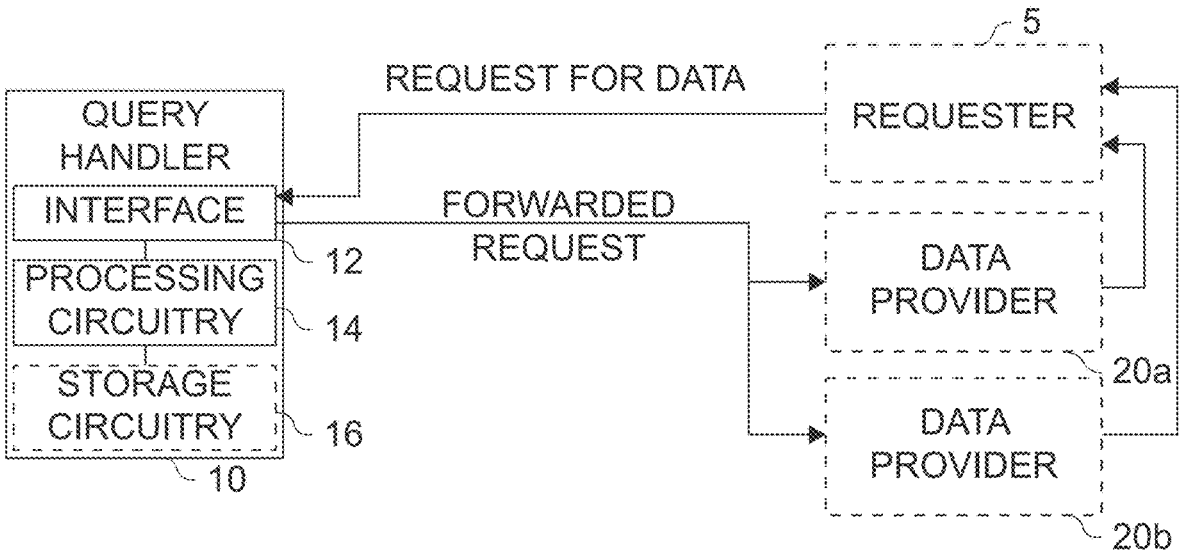
FIG. 1a shows a block diagram of an example of a query handler device.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Various examples of the present disclosure relate to a query handler device 10, to a system comprising the query handler device, to a method for a query handler device (and for other components of the system), and to a computer program for a query handler device. In the following, a short introduction of the respective components (query handler device 10, data provider devices 20 (e.g., 20a, 20b), data sources 30 (e.g., 30a, 30b) and requester device 5 is given, followed by a discussion of the interaction between the respective devices.

FIG. 1a shows a block diagram of an example of a query handler device 10. The query handler device 10 is suitable for accessing data (e.g., data relevant for machine learning with respect to classification, e.g., for training a machine-learning model to perform classification). The query handler device comprises at least one interface 12 and processing circuitry 14, which is coupled to the at least on interface 12. Optionally, the query handler device 10 further comprises storage circuitry 16, which is also coupled to the processing circuitry 14. In general, the functionality of the query handler device 10 is provided by the processing circuitry 14, in conjunction with the at least one interface 12 (for communicating with other entities, such as with the requester device 5 and with the plurality of data provider devices 20) and/or the storage circuitry 16 (for storing and/or retrieving information).

The processing circuitry 14 of the query handler device 10 is configured to obtain a request for data from the requester device 5 (e.g., via the interface 12). The processing circuitry 14 of the query handler device 10 is configured to determine an access policy for the requester device 5. The processing circuitry 14 of the query handler device 10 is configured to forward the request with information on the access policy to the plurality of data provider devices (e.g., via the interface 12), in order to instruct the plurality of data provider devices to provide the data to the requester device according to the access policy.

Figure 1B:
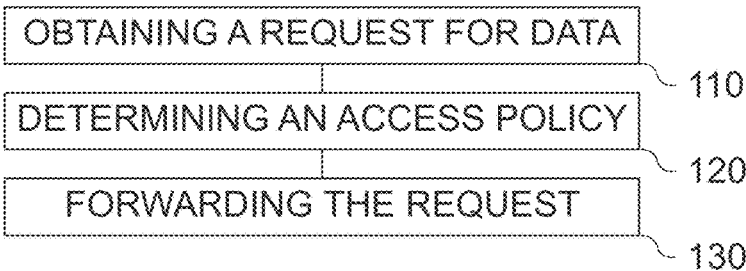
FIG. 1b shows a flow chart of an example of a query handler method.

FIG. 1b shows a flow chart of an example of a corresponding query handler method for accessing data. The method comprises obtaining 110 the request for data from the requester device. The method further comprises determining 120 the access policy for the requester device. The method comprises forwarding 130 the request with information on the access policy to a plurality of data provider devices, to instruct the plurality of data provider devices to provide the data to the requester device according to the access policy. In general, at this point, the method may be performed by the query handler method. Accordingly, features introduced in connection with the query handler device may likewise be included in the corresponding query handler method. However, in some examples, the method may be performed jointly by different devices, e.g., the query handler device and the data provider devices, or the query handler device, the data provider devices, and the data source devices. Accordingly, features introduced in connection with the query handler device, the data provider devices and the data source devices may likewise be included in the query handler method.

Figure 1C:
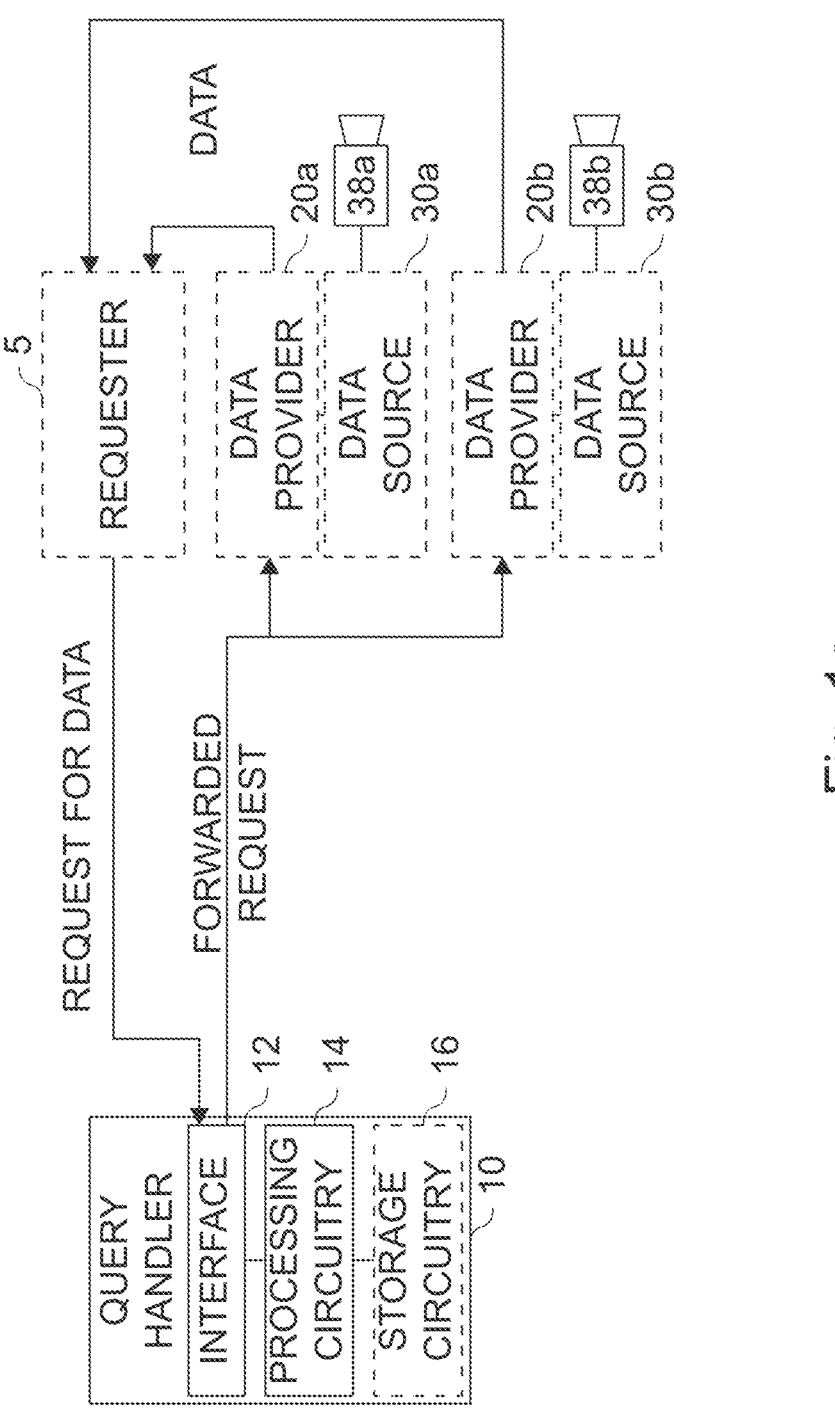
FIG. 1c shows a block diagram of an example of a system comprising a query handler device, a plurality of data provider devices and, optionally, a plurality of data sources devices.

In FIG. 1c, an overview is given with respect to the different components discussed herein. FIG. 1c shows a block diagram of an example of a system comprising the query handler device 10, a plurality of data provider devices 20, and, optionally, a plurality of data sources devices 30.

As shown in FIG. 1c, the requester device 5 (i.e., the requester device) transmits a request for data to the query handler 10 (e.g., to the interface 12 of the query handler), which the query handler forwards (via the interface 12) to the respective data providers 20a; 20b. The data providers 20a; 20b are each coupled with one or more data sources 30a; 30b (which may use sensor devices 38a; 38b to generate the data). The data providers receive the forwarded requests, compare them to the data available at the respective data provider, process the access policy for providing data to the requester device, and may then provide the data to the requester device 5.

Figure 2:
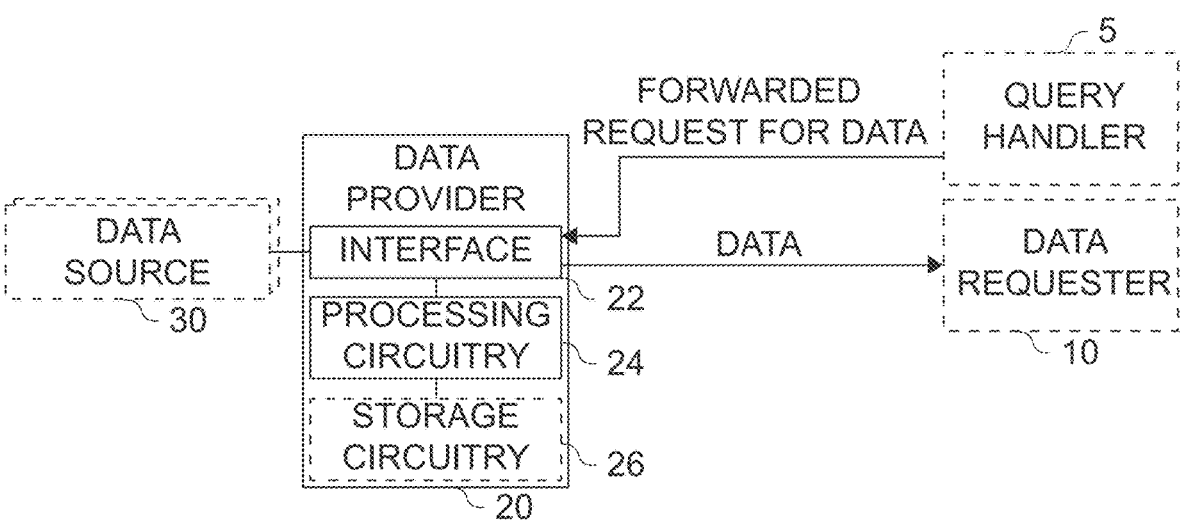
FIG. 2 shows a block diagram of an example of a data provider device.

In the following, more details on the data provider devices 20 and the data source devices 30 are given. FIG. 2 shows a block diagram of an example of a data provider device 20. The data provider device 20 may comprise at least one interface 22 and processing circuitry 24, which is coupled to the at least on interface 22. Optionally, the data provider device 20 further comprises storage circuitry 26, which is also coupled to the processing circuitry 24. In general, the functionality of the data provider device 20 is provided by the processing circuitry 24, in conjunction with the at least one interface 22 (for communicating with other entities, such as with the requester device 5, with the query handler device 10 and/or with the data source devices 30) and/or the storage circuitry 26 (for storing and/or retrieving information).

For example, the processing circuitry 24 of the data provider device 20 may be configured to obtain the forwarded request with the information on the access policy for the requester device (from the query handler device 10, e.g., via the interface 22). The processing circuitry 24 of the data provider device 20 may be configured to provide, if the data requested is available at the data provider device and can be provided according to the access policy, the data to the requester device (e.g., via the interface 22).

Figure 3:
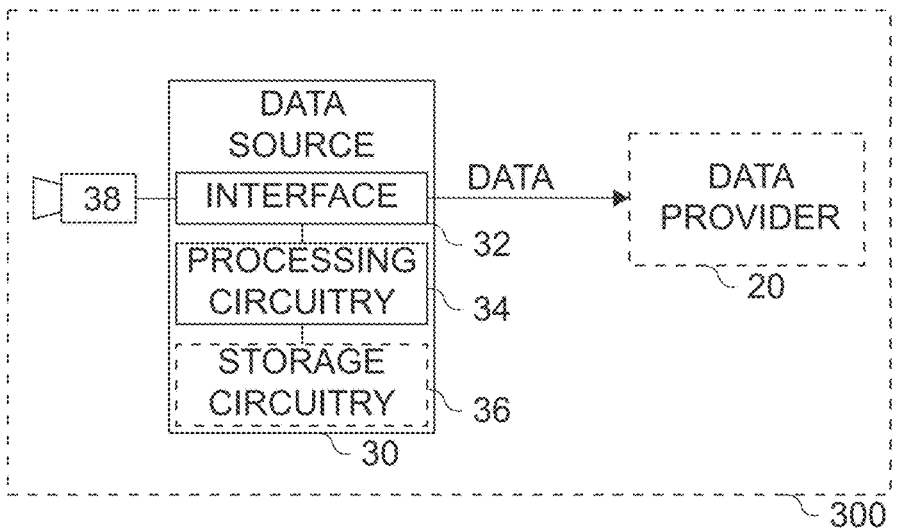
FIG. 3 shows a block diagram of an example of a data source device.

FIG. 3 shows a block diagram of an example of a data source device 30. The data source device may comprise at least one interface 32 and processing circuitry 34, which is coupled to the at least on interface 32. Optionally, the data source device 30 further comprises storage circuitry 36, which is also coupled to the processing circuitry 34. In general, the functionality of the data source device 30 is provided by the processing circuitry 34, in conjunction with the at least one interface 32 (for communicating with other entities, such as with at least one of the data provider devices 20) and/or the storage circuitry 36 (for storing and/or retrieving information). For example, the processing circuitry 34 of the data source device 30 may be configured to provide the data to the at least one data provider device.

As is evident, the components of the proposed system interact with another. Accordingly, the features of the respective components 10; 20; 30 are now illustrated in more detail with respect to the different components of the system.

In various examples, the proposed concept is centered around data that is being provided by the data source devices and a corresponding classification of said data. Accordingly, the data being requested may be data relevant with respect to machine-learning, e.g., data relevant for classification. In the proposed concept, a differentiation may be made between the data and the classification of the data, in particular with respect to how the respective piece of information (data and classification thereof) is made available. In particular, in the proposed concept, the classification may be used as key for accessing the respective data—therefore, the classification of the data may be made more readily available than the data itself. The data itself, e.g., the sensor data being classified, is handled more restrictively, and is disclosed only to other entities that are deemed worthy of getting access to the respective data.

In general, both the data and the classification of the data may be provided by the data source device. For example, the at least one interface 32 of the data source device may be suitable for communicating with at least one sensor 38 of the data source device. For example, the data source device 30 may comprise one or more sensors, such as at least one of a camera sensor, a microphone, a depth sensor, and an accelerometer. The processing circuitry 34 of the data source device may be configured to determine the data based on sensor data of the at least one sensor of the data source device. In other words, the processing circuitry of the data source device may be configured to detect the presence of something classifiable (such as an object, person, event, scene, activity, or act) in the sensor data, and may store the respective data using the storage circuitry of the processing circuitry, e.g., for subsequent training of a machine-learning model and/or sharing with other devices. For example, the data (being subsequently requested by the requested device) may be sensor data, or an abstraction of sensor data (e.g., an embedding of sensor data), of at least one of an object, person, event, scene, activity, and act being classified. Accordingly, the classification may relate to at least one of an object, person, event, scene, activity, and act being represented in the data.

As outlined above, the data being requested by the requester device may be requested via its classification. In other words, the requester device may request (all) data that is relevant with respect to a particular classification. For example, the requester device may do so in order to train and/or improve its own classifier, e.g., after first having been made aware of the classification. To give a practical example—when a new security camera is installed in a home, it may be supplied with the identities of the people living in the home. The security camera may use the identities to request, from previously installed security cameras, autonomous robot pets, video chat terminals etc., data that can be used to train a machine-learning-based classifier of the new security camera, to avoid raising an alarm when a person living in the home is shown in video footage. Accordingly, the request issued by the requester device may include a reference to a classification result, with the data being requested being relevant for machine learning with respect to the classification result.

To provide the data in response to a request comprising a classification result, the same classification may be performed by the data source as well. In other words, the processing circuitry of the data source device may be configured to process the data using a machine-learning model (e.g., by providing the data to an input of the machine-learning model). The processing circuitry of the data source device may be configured to determine the classification of the data based on an output of the machine-learning model. For example, the machine-learning model may be a trained classifier, i.e., a machine-learning model being trained to output a classification based on data being classified. For example, the output of the machine-learning model (e.g., a pre-defined identifier) may be indicative of the classification result. After having classified the data, the processing circuitry of the data source device may be configured to provide the data to the at least one data provider device with information on the classification.

In the following, a basic introduction to machine-learning-based classification is given. Machine learning refers to algorithms and statistical models that computer systems may use to perform a specific task without using explicit instructions, instead relying on models and inference. For example, in machine-learning, instead of a rule-based transformation of data, a transformation of data may be used, that is inferred from an analysis of historical and/or training data. For example, the content of images may be analyzed using a machine-learning model or using a machine-learning algorithm. In order for the machine-learning model to analyze the content of an image, the machine-learning model may be trained using training images as input and training content information as output. By training the machine-learning model with a large number of training images and associated training content information, the machine-learning model "learns" to recognize the content of the images, so the content of images that are not included of the training images can be recognized using the machine-learning model. The same principle may be used for other kinds of sensor data as well: By training a machine-learning model using training sensor data and a desired output, the machine-learning model "learns" a transformation between the sensor data and the output, which can be used to provide an output based on non-training sensor data provided to the machine-learning model.

Machine-learning models are trained using training input data. The examples specified above use a training method called "supervised learning". In supervised learning, the machine-learning model is trained using a plurality of training samples, wherein each sample may comprise a plurality of input data values, and a plurality of desired output values, i.e., each training sample is associated with a desired output value. By specifying both training samples and desired output values, the machine-learning model "learns" which output value to provide based on an input sample that is similar to the samples provided during the training. Apart from supervised learning, semi-supervised learning may be used. In semi-supervised learning, some of the training samples lack a corresponding desired output value. Supervised learning may be based on a supervised learning algorithm, e.g., a classification algorithm, a regression algorithm, or a similarity learning algorithm. Classification algorithms may be used when the outputs are restricted to a limited set of values, i.e., the input is classified to one of the limited set of values. Regression algorithms may be used when the outputs may have any numerical value (within a range). Similarity learning algorithms are similar to both classification and regression algorithms but are based on learning from examples using a similarity function that measures how similar or related two objects are. In the proposed concept, classification algorithms may be used, in order to generate a classification result based on the (sensor) data.

In some examples of the present disclosure, additional techniques may be used to improve the classification. In particular, as is evident from the "home security" example given above, a person, object, activity, event etc. may be perceived by different data source device, e.g., at the same time or at slightly different times (e.g., as a person walks along a hallway). In this case, multiple source devices may collect data on the same person (or object, event, activity etc.). In some examples, the data source devices (or rather some of the data source device, e.g., data source devices having perceived the same person, object, event, activity etc.), may coordinate the classification among themselves, e.g., using a privacy-preserving coordination mechanism. In other words, the processing circuitry of the data source device may be configured to coordinate the classification of the object, person, event, scene, activity, or act with the one or more other data source devices using a privacy-preserving coordination mechanism (based on (sensor) data generated by the respective data source devices. In particular, a privacy-preserving coordination mechanism may be used, where the data source device and the one or more other data source devices vote on a particular classification of a person, object, event, activity, or act. For example, each of the data source devices involved in the privacy-preserving coordination/voting mechanism may provide their classification result, or a value derived from the classification result, to at least one other data source device, which may perform an operation on the classification or value derived from the classification to coordinate/vote upon the classification. For example, the data source devices may vote on the classification or share information derived from the local classification result in general. For example, the data source devices may perform label sharing. When data source devices have clearance to access a predicted class, they can share their label to data source devices with lower confidence (used in particular for onboarding new devices). For example, one of the data source devices may label a piece of data, then submit its result together with some signature or proof to the other data source devices. Then they can decide to use/evaluate this label however they see fit and submit their analysis back to the other data source devices. For example, the privacy-preserving coordination mechanism may be based on at least one of homomorphic encryption, adding random noise and multi-party computation. In homomorphic encryption, data, such as the classification, is encrypted such, that the source data cannot be restored, while retaining mathematical properties that can be used to jointly determine a result (e.g., the classification). In Multi Party Computation, multiple participants (e.g., the date source device and the one or more other data source devices) each have private data (e.g., the classification), which they use to jointly compute the value of a public function (the coordinated classification) using the private data without revealing the private data. For example, a secret sharing scheme, such as Shamir secret sharing or additive secret sharing, may be used determine the classification, with the respective classifications being the shared secrets of the respective data source devices. In a privacy-preserving coordination/voting mechanism that is based on adding random noise, the respective data source devices can choose, according to a probability function, to share the classification result they have determined or a different (and likely false) classification result, such that the other data source devices cannot be sure that the classification being shared is the one being determined by the data source device.

Once the classification result is determined (and, optionally, coordinated), the data source devices may provide the respective classification result, along with the data, to the respective data provider devices. Accordingly, the processing circuitry of the data provider device may be configured to obtain the data (e.g., with the classification result) from the one or more data source devices. In general, there may be a 1-to-1 relationship between data source devices and data provider devices. For example, a device, such as camera, video terminal, robot pet, may comprise both a data source device and an associated data provider device. Alternatively, the devices may be separate. In particular, the data provider devices may each be associated with (e.g., receive data from) one or more data source devices. On the other hand, the data source devices may each be associated with (e.g., provide data to) one or more data provider devices.

In various examples, the data being provided by the data source devices may be encrypted. For example, the processing circuitry of the data source device may be configured to encrypt the data before providing the data to the at least one data provider device. Accordingly, the processing circuitry of the data provider device may be configured to obtain the data in encrypted form. For example, as shown in connection with FIG. 4, the data may be encrypted according to the classification, e.g., with a public key that is associated with the classification. Alternatively, the data may be encrypted with a key that is specific (e.g., known) to the associated data provider device, e.g., to allow transformation, decryption and/or re-encryption by the data provider device. Alternatively, any other form of (pubic key-based) encryption may be used.

Once the data is made available to the respective data provider device(s), it can be accessed by the requester device, via the query handler device. Accordingly, the processing circuitry of the query handler device is configured to obtain a request for data from the requester device. In general, any device may be a requester device. However, given the data being requested, the requester devices may in particular be devices that wish to train a machine-learning model, e.g., a classifier, using the data being requested. For example, the data source device(s) introduced above may both be suppliers of such data and users of such data. For example, the processing circuitry of the data source device may be configured to request further data from the query handler device, and to train the machine-learning model based on the further data. However, also non-data source devices (or future data source devices) may request such data. The request for the data may be handled (e.g., granted or denied) depending on whether the data source devices agree with what the requester device intends (or claims) to do with the data.

In the proposed concept, the query handler device acts as a central gatekeeper for accessing the data generated by the data source devices. However, the burden on deciding what data is being provided may be shared by the query handler device and the data handler devices—while the query handler devices may thwart some types of unwanted access (e.g., excessive numbers of requests, or requests that would amount to index building), the respective data provider devices may determine themselves whether requests (that are actually forwarded by the query handler device) are to be responded to with data.

The processing circuitry of the query handler device is configured to determine an access policy for the requester device, and to forward the request with information on the access policy to the plurality of data provider devices, to instruct the plurality of data provider devices to provide the data to the requester device according to the access policy. In general, the access policy may be based on what the requester device intends to do with the data, e.g., whether the requester device claims to only use the data for local machine-learning training, whether the device claims to share the data with other devices, or whether the device claims to share the trained machine-learning model (which may contain private information) with other devices. To determine this access policy, the query handler device may comprise an index of the data access policies supported by different requester devices, or the query handler device may build such an index (or act in ad-hoc fashion) by receiving the respective information from the requester device. In other words, the processing circuitry of the query handler device may be configured to obtain authentication information from the requester device, and to determine the access policy for the requester device based on the authentication information. For example, the processing circuitry of the query handler device may be configured to identify the requester device based on the authentication, and to obtain the access policy for the requester device based on the identity of the requester device. Alternatively, or additionally, the processing circuitry of the query handler device may be configured to obtain information on a data processing policy (i.e., what the requester device intends to do with the data) of the requester device from the requester device, and to determine the access policy for the requester device based on the data processing policy of the requester device. In particular, the processing circuitry of the query handler device may be configured to negotiate the access policy with the requester device, e.g., based on the data processing policy of the requester device and based on a default data access policy applied by the query handler device.

Part of the gatekeeper functionality of the query handler device relates to deciding which requests to forward. For example, the query handler device may discard some requests that it deems violate the access policy of the requester device or that violate a default access policy applied (e.g., enforced) by the query handler device. For example, in the proposed concept, a concept called "privacy-preserving document sharing" may be applied. In this concept, the query handler device itself might not contain the data, or information on which data provider device contains which kind of data (e.g., with data provider device has data with respect to a particular classification result)—it merely acts as a gatekeeper and proxy for forwarding (most of) the requests to the data provider devices. The data providers then decide to provide the data only to requester devices that are allowed to access the data. To thwart efforts of a requester device to circumvent the restrictions imposed by the query handler device, e.g., in order to build an index on which data provider has what data, the query handler device may impose restrictions on the requests received from the requester device(s). In particular, the processing circuitry of the query handler device may be configured to impose rate limiting on requests from requester devices. For example, the rate limiting may be based on a number of requests per requester device in a pre-defined time interval, e.g., to avoid a requester device successively requesting all data made available by the provider devices. Alternatively, or additionally, the rate limiting may refer to a scope of the requests per requester device across an index of possible classifications (e.g., to avoid index building by the requester device).

Once (and if) the request has been forwarded to the data provider devices (e.g., all of the data provider devices, or the data provider devices that are likely to provide data according to the access policy), it is processed by the respective data providers, and, depending on the data available and the access policy, the is provided to the requester device. In other words, the processing circuitry of the requester device may be configured to obtain the forwarded request with the information on the access policy for the requester device, and to provide, if the data requested is available at the data provider device and can be provided according to the access policy, the data to the requester device. In particular, the processing circuitry of the data provider device may be configured to provide the data to the requester device without involving the query handler device (e.g., without the data being accessible to the query handler). For example, the processing circuitry of the data provider device may be configured to compare the access policy for the requester device with the access policy or data sharing policy of the data provider device (or source device the data originates from), and to provide the data if the access policy for the requester device is in line with the access policy or data sharing policy of the data provider device (or source device). This way, also the query handler device does not know which data provider devices has access to data according to a given classification.

As outlined in connection with the data source devices, the data may be accessed via a classification of the data. In other words, the requester device may specify a classification result, and the data providers may provide data that has been classified according to the classification result being requested. In other words, the request (of the requester device) may include a reference to a classification result. The processing circuitry of the data provider device may be configured to obtain the data with information on a classification result with respect to the data (from the respective data source device), and to provide the data based on a match between the information on the classification result included within the data and the information on the classification result included in the request. In other words, data that has the same classification as the classification being requested may be provided.

In some examples, the data may be transformed by the data provider device. In other words, the processing circuitry of the data provider device may be configured to transform the data before providing the data to the requester device. For example, a privacy preserving transformation (e.g., embedding) may be applied on the data by the data provider device. For example, the data may be decrypted by the data provider device (e.g., in order to apply the transformations). In other words, the processing circuitry of the data provider device may be configured to decrypt the data before providing the data to the requester device. After transformation, the data may be re-encrypted by the data provider device. Alternatively, the data may be re-encrypted without previous decryption, e.g., in order to specifically re-encrypt the data for the requester device. For example, techniques such as updateable encryption or hybrid proxy re-encryption may be used to re-encrypt the data without decrypting the data. For example, both updateable encryption and hybrid proxy re-encryption use a key-rotation-based system to re-encrypt the data without decrypting the data. As a result, the processing circuitry of the data provider device may be configured to re-encrypt the data before providing the data to the requester device.

Various examples of the present disclosure relate to machine-learning-based classification of data. As outlined in connection with the introduction of said data, a supervised learning algorithm, and in particular a classification algorithm, may be used to train a machine-learning model such that the machine-learning model is trained to classify the data. For example, when the data is image data, a plurality of training input samples of input data may be used, along with a desired classification result, to train the machine-learning model to classify image data. Similarly, when the data is voice data (obtained via a microscope), depth sensor data (obtained via a depth sensor) or sensor data indicative of a gait of a person (obtained via an accelerometer), a plurality of training input samples of voice data, depth sensor data or sensor data indicative of the gait may be used, along with a desired classification result, to train the machine-learning model to classify voice data, depth sensor data or sensor data indicative of the gait.

Machine-learning algorithms are usually based on a machine-learning model. In other words, the term "machine-learning algorithm" may denote a set of instructions that may be used to create, train, or use a machine-learning model. The term "machine-learning model" may denote a data structure and/or set of rules that represents the learned knowledge, e.g., based on the training performed by the machine-learning algorithm. In embodiments, the usage of a machine-learning algorithm may imply the usage of an underlying machine-learning model (or of a plurality of underlying machine-learning models). The usage of a machine-learning model may imply that the machine-learning model and/or the data structure/set of rules that is the machine-learning model is trained by a machine-learning algorithm.

For example, the machine-learning model may be an artificial neural network (ANN). ANNs are systems that are inspired by biological neural networks, such as can be found in a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of the sum of its inputs. The inputs of a node may be used in the function based on a "weight" of the edge or of the node that provides the input. The weight of nodes and/or of edges may be adjusted in the learning process. In other words, the training of an artificial neural network may comprise adjusting the weights of the nodes and/or edges of the artificial neural network, i.e., to achieve a desired output for a given input. In at least some embodiments, the machine-learning model may be deep neural network, e.g., a neural network comprising one or more layers of hidden nodes (i.e., hidden layers), prefer-ably a plurality of layers of hidden nodes.

Alternatively, the machine-learning model may be a support vector machine. Support vector machines (i.e., support vector networks) are supervised learning models with associated learning algorithms that may be used to analyze data, e.g., in classification or regression analysis. Support vector machines may be trained by providing an input with a plurality of training input values that belong to one of two categories. The support vector machine may be trained to assign a new input value to one of the two categories. Alternatively, the machine-learning model may be a Bayesian network, which is a probabilistic directed acyclic graphical model. A Bayesian network may represent a set of random variables and their conditional dependencies using a directed acyclic graph. Alternatively, the machine-learning model may be based on a genetic algorithm, which is a search algorithm and heuristic technique that mimics the process of natural selection.

The at least one interface 12; 22; 32 of the query handler device 10, the data provider device 20 and/or the data source device 30 may correspond to one or more inputs and/or outputs for receiving and/or transmitting information, which may be in digital (bit) values according to a specified code, within a module, between modules or between modules of different entities. For example, the at least one interface 12; 22; 32 of the query handler device 10, the data provider device 20 and/or the data source device 30 may comprise interface circuitry configured to receive and/or transmit information.

In embodiments the processing circuitry 14; 24; 34 of the query handler device 10, the data provider device 20 and/or the data source device 30 may be implemented using one or more processing units, one or more processing devices, any means for processing, such as a processor, a computer or a programmable hardware component being operable with accordingly adapted software. In other words, the described function of the processing circuitry 14; 24; 34 of the query handler device 10, the data provider device 20 and/or the data source device may as well be implemented in software, which is then executed on one or more programmable hardware components. Such hardware components may comprise a general-purpose processor, a Digital Signal Processor (DSP), a micro-controller, etc.

In at least some embodiments, the storage circuitry 16; 26; 36 of the query handler device 10, the data provider device 20 and/or the data source device 30 may comprise at least one element of the group of a computer readable storage medium, such as an magnetic or optical storage medium, e.g. a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

More details and aspects of the query handler device, data provider device, data source device, requester device, system, method, and computer program are mentioned in connection with the proposed concept, or one or more examples described above or below (e.g., FIGS. 4 to 6). The query handler device, data provider device, data source device, requester device, system, method, and computer program may comprise one or more additional optional features corresponding to one or more aspects of the proposed concept, or one or more examples described above or below.

Various examples of the present disclosure relate to a concept for collaborative ML (Machine Learning) at the edge.

In the following, we may assume that the devices (data sources and/or data providers) are organized in groups within which a higher level of trust between devices is present. However, within a group, say devices belonging to a family, different data sharing policies apply to different devices and tasks. Optionally, data sharing between groups is allowed with stricter privacy policies.

Some technology may be deemed to missing for performing training on the edge, such as technology for discovery of dataset availability, technology for semantic description of data types (e.g. rgb_image (Red-Green-Blue image), no-AWB (Auto White Balance), M12-f/2-24 mm (camera type, aperture, focal distance), 1024×768 pixel, . . . ), technology for training on same-type-of-data, where data comes from different devices, technology for automated data-labeling at the edge for same-type-of-data, technology for training when each type of data comes from a different device or technology for privacy-preserving peer-to-peer learning through contextual privacy-preserving dynamic access control.

In the proposed concept, the context is evaluated by devices themselves based on sensor input and used in an access control layer. Collaboration can be present for either the context evaluation and/or any additional task which is not involved in access control. The proposed concept may provide privacy-preserving peer-to-peer learning through contextual privacy-preserving dynamic access control.

In the following, an example of an inference strategy according to the proposed concept is shown. In the following, as shown in FIG. 4, a multiplicity of devices 30 (e.g., data source 30*a* with camera 38*a*, and another data source coupled with camera 38*b*) have access to the same context/subject 410. They can collaboratively collect information and learn to detect a particular event, but they cannot freely share information as there are privacy concerns. FIG. 4 shows a schematic overview of collaborative inference according to an example.

In various examples of the proposed concept, the device(s) 30*a* classify the context in order to determine if the recorded information is useful for collaborative training purposes. In addition, devices can remove any information for which a collaborating device has no clearance. One or several models local to a device can be used to generate inference results used in access control described in connection with FIG. 5 (data distribution).

Figures 4, 6:
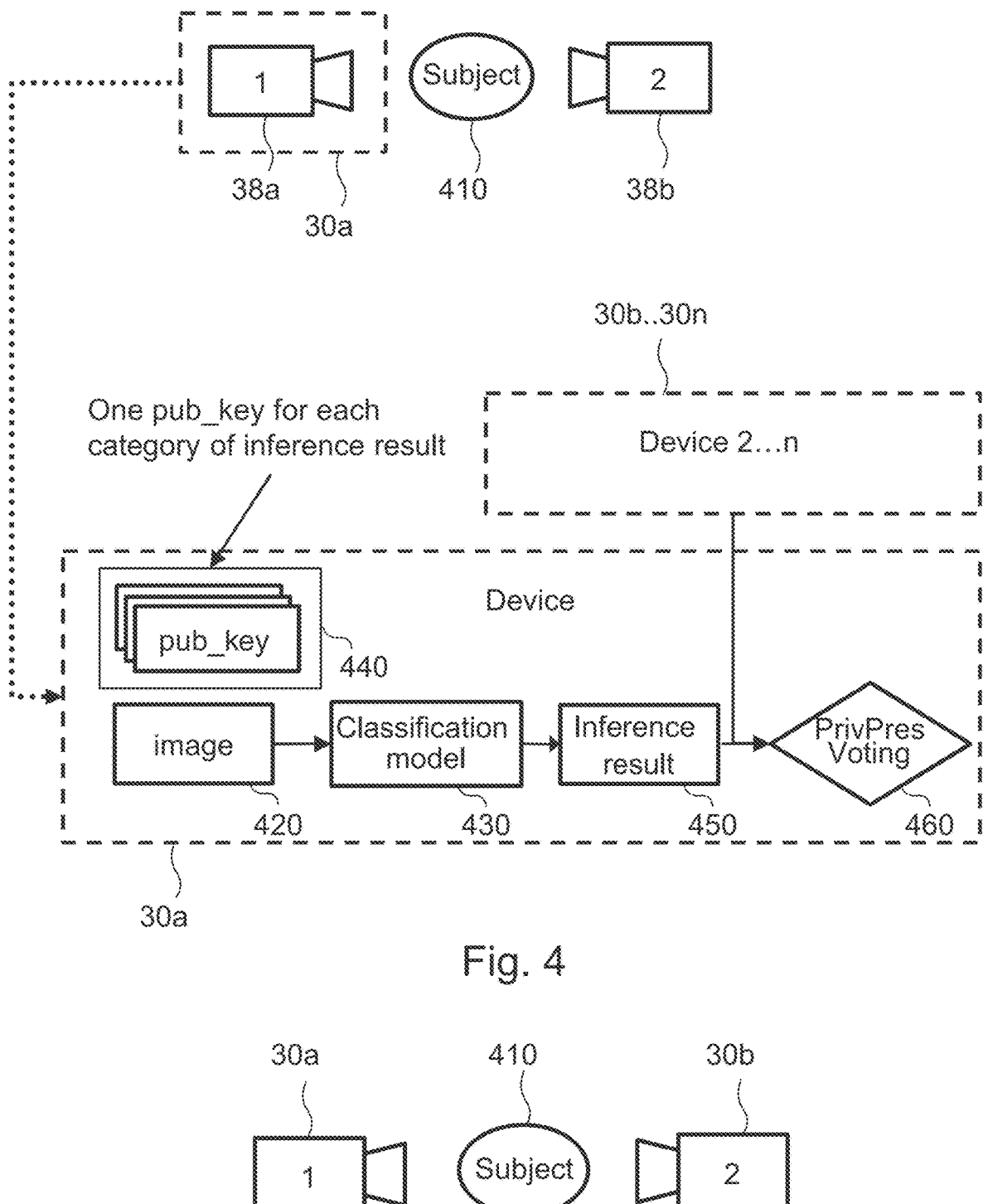
FIG. 4 shows a schematic overview of collaborative inference according to an example.
FIG. 6 shows a schematic diagram of a scenario, where two devices monitor the same subject.
Figure 5:
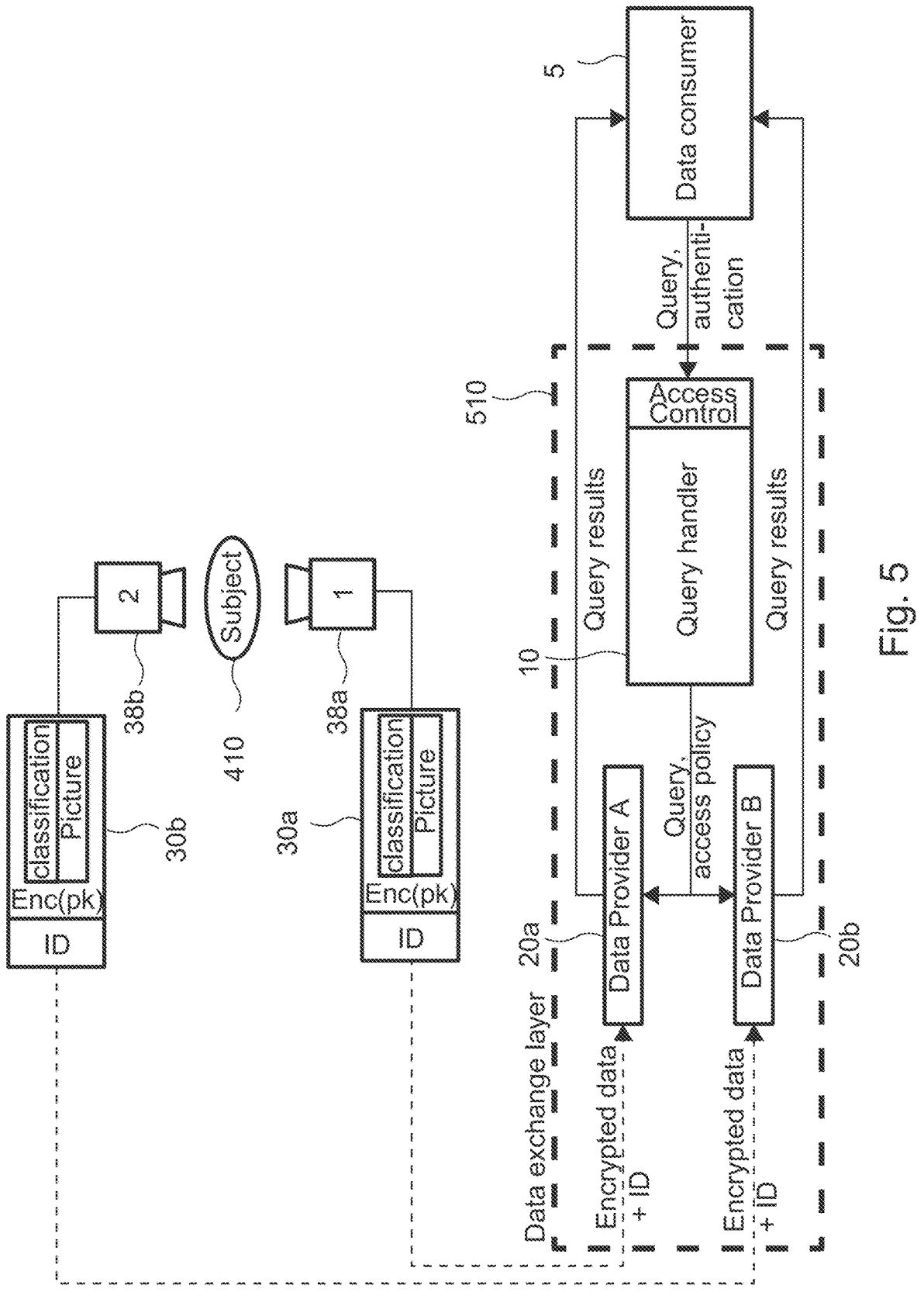
FIG. 5 shows a schematic diagram of a system comprising data sources, data providers and a query handler.

In FIG. 4, the device 30*a* takes an image 420 of a subject 410 using the camera 38*a* and uses a classification model 430 to output inference results 450 (categorizing the subject or even). For each category of inference result, the device may comprise one pub_key 440. A privacy-preserving voting mechanism 460 may be used to coordinate the classification result with other devices 30*b* . . . 30*n*.

In some examples, the private data is protected by a key (e.g., pub_key) associated with the subject of the picture. In order to be sure that the key is the correct one, the proposed concept may attempt to ensure that the inference result is correct. To confirm that the inference result is correct, the privacy-preserving voting (or coordination) mechanism 460 may be used, which may be based on homomorphic encryption, adding random noise, or multi-party computation. If a consensus is reached, then the public encryption key (pub_key) related to that inference result may be used.

In the following, an example of a data sharing strategy is proposed. For example, a combination of privacy preserving indexing, and dynamic access control, may be used to access the data of the data sources. The following diagram shows a basic architecture which supports such features. FIG. 5 shows a schematic diagram of a system comprising data sources 30*a*; 30*b*, data providers 20*a*; 20*b* and a query handler 10, with the query handler being contacted by requester device (data consumer) 5. In some examples, data providers can be the devices themselves. The query handler 10 can be global or act only in a specific trusted network or be logically split between devices (e.g., if devices evaluate how to answer a query broadcasted by a neighboring device).

The data sources 30*a*; 30*b* may use their respective cameras 38*a*; 38*b* to take photos of a subject 410. The data sources may use a classification model to classify the picture (e.g., an object, person, event, or activity shown in the picture), to determine an ID (identifier) representing the classification, and to encrypt the data using the pub_key associated with the classification. The encrypted data and ID may be provided, by the data sources 30*a*; 30*b* to the respective data providers 20*a*; 20*b* coupled with the data sources 30*a*; 30*b*, which may store the encrypted data and ID. A data consumer (or requester device) 5 may authenticate vis-à-vis the query handler 10, and submit a query (e.g., request) for data to the query handler 10. The query handler 10 may perform access control on the query, determine an access policy, and forward the query along with the access policy to the data providers 20*a*; 20*b*. The data providers 20*a*; 20*b* may use the access policy and query to decide whether to provide query results to the data consumer 5.

In some examples, the proposed concept may be used so devices can obtain data necessary for training purposes by taking the role of a data consumer. FIG. 6 shows such a scenario. FIG. 6 shows a scenario, where two devices 30*a*; 30*b* monitor the same subject. Either device may use the data access scheme shown in FIG. 5 (shown as optional mediator(s) 610) to access the data of the respective other device.

In the following, some examples are given with respect to training strategy. At initialization, an initialization labelling period may be used for the classification models to start working. The labels that are defined may then be usable to create access groups with varied level of clearance. Once devices have the capability to assess that some data can be shared, they can start collaborating on a learning task, for instance improving the access control models.

In addition, continuous improvement may be targeted. One or more of the following three mechanisms may be used for collaboration through knowledge sharing between devices. For example, label sharing may be performed. When devices have clearance to access a predicted class, they can share their label to devices with lower confidence (used in particular for onboarding new devices). For example, a privacy-preserving consensus mechanism may be employed. In such a mechanism, devices may collaboratively decide a label without sharing each individual labels. For example, curated data sharing may be used. Once a device learned a model flagging private data, it can use that model to remove that information from the raw data and share the curated data. For instance, if a device has access to images of an individual but access is restricted to others if this individual is found in an image, then the device can participate in labelling images to improve the quality of this filter.

With respect to security, in the semi-local voting system, a device can be flagged as corrupted if it shows a discrepancy between the quality of its votes and the maturity of its model. Model maturity can be estimated in various ways at the consensus level. The data consumer can be evaluated similarly by assuming he has a good model maturity and depending on the level of trust of the data consumer. In general, a user having access to data does not mean the user being cleared to access classification models, as private information can still be embedded in models that he does not have access to.

More details and aspects of the concept for collaborative machine learning at the edge are mentioned in connection with the proposed concept or one or more examples described above or below (e.g., FIGS. 1a to 3). The concept for collaborative machine learning at the edge may comprise one or more additional optional features corresponding to one or more aspects of the proposed concept, or one or more examples described above or below.

In the following, some examples of the proposed concept are presented:

(1) A query handler device 10 for accessing data, the query handler device comprising:

at least one interface 12 configured to communicate with a requester device 5 and with a plurality of data provider devices 20; and processing circuitry 14 configured to:

obtain a request for data from the requester device, determine an access policy for the requester device, forward the request with information on the access policy to the plurality of data provider devices, to instruct the plurality of data provider devices to provide the data to the requester device according to the access policy.

(2) The query handler device according to (1), wherein the request includes a reference to a classification result, with the data being requested being relevant for machine learning with respect to the classification result.

(3) The query handler device according to (2), wherein the data being requested is sensor data or an abstraction of sensor data of at least one of an object, person, event, scene, activity, and act being classified, and/or wherein the data being requested is data relevant with respect to machine-learning, and/or wherein the data being requested is data relevant for classification.

(4) The query handler device according to one of (1) to (3), wherein the processing circuitry is configured to obtain authentication information from the requester device, and to determine the access policy for the requester device based on the authentication information.

(5) The query handler device according to one of (1) to (4), wherein the processing circuitry is configured to obtain information on a data processing policy of the requester device from the requester device, and to determine the access policy for the requester device based on the data processing policy of the requester device.

(6) The query handler device according to one of (1) to (5), wherein the processing circuitry is configured to negotiate the access policy with the requester device.

(7) The query handler device according to one of (1) to (6), wherein the processing circuitry is configured to impose rate limiting on requests from requester devices.

(8) The query handler device according to (7), wherein the rate limiting is based on a number of requests per requester device in a pre-defined time interval or wherein the rate limiting refers to a scope of the requests per requester device across an index of possible classifications.

(9) A system comprising the query handler device 10 according to one of (1) to (8) and the plurality of data provider devices 20, wherein each data provider device comprises at least one interface 22 for communicating with the query handler device 10 and for communicating with the requester device 5, and processing circuitry 24 configured to obtain the forwarded request with the information on the access policy for the requester device, and provide, if the data requested is available at the data provider device and can be provided according to the access policy, the data to the requester device.

(10) The system according to (9), wherein the processing circuitry of the data provider device is configured to provide the data to the requester device without involving the query handler device.

(11) The system according to one of (9) or (10) wherein the at least one interface of the data provider device is further suitable for communicating with one or more data source devices 30, the processing circuitry of the data provider device being configured to obtain the data from the one or more data source devices.

(12) The system according to (11), wherein the processing circuitry of the data provider device is configured to obtain the data in encrypted form.

(13) The system according to (12), wherein the processing circuitry of the data provider device is configured to decrypt or re-encrypt the data before providing the data to the requester device.

(14) The system according to one of (11) to (13), wherein the processing circuitry of the data provider device is configured to transform the data before providing the data to the requester device.

(15) The system according to one of (11) to (14), wherein the processing circuitry of the data provider device is configured to obtain the data with information on a classification result with respect to the data, with the request including a reference to the classification result, and with the processing circuitry of the data provider device being configured to provide the data based on a match between the information on the classification result included within the data and the information on the classification result included in the request.

(16) The system according to one of (11) to (15), further comprising a plurality of data source devices 30, wherein each data source device comprises at least one interface 32 for communicating with at least one of the plurality of data provider devices, processing circuitry 34 configured to provide the data to the at least one data provider device.

(17) The system according to (16), wherein the processing circuitry of the data source device is configured to process the data using a machine-learning model, determine a classification of the data based on an output of the machine-learning model, and to provide the data to the at least one data provider device with information on the classification.

(18) The system according to (17), wherein the classification relates to at least one of an object, person, event, scene, activity and act being represented in the data, the at least one interface of the data source device being further suitable for communicating with one or more other data source devices, and the processing circuitry of the data source device being configured to coordinate the classification of the object, person, event, scene, activity or act with the one or more other data source devices using a privacy-preserving coordination mechanism.

(19) The system according to (18), wherein the privacy-preserving coordination mechanism is based on at least one of homomorphic encryption, adding random noise and multi-party computation.

(20) The system according to one of (18) or (19), wherein the privacy-preserving coordination mechanism is a privacy-preserving voting mechanism.

(21) The system according to one of (16) to (20), wherein the processing circuitry of the data source device is configured to request further data from the query handler device, and to train the machine-learning model based on the further data.

(22) The system according to one of (16) to (21), wherein the processing circuitry of the data source device is configured to encrypt the data before providing the data to the at least one data provider device.

(23) The system according to one of (16) to (22), wherein the at least one interface of the data source device being further suitable for communicating with at least one sensor 38 of the data source device, with the processing circuitry of the data source device being configured to determine the data based on sensor data of the at least one sensor of the data source device.

(24) A query handler method for accessing data, the query handler method comprising:
obtaining 110 a request for data from a requester device;
determining 120 an access policy for the requester device;
forwarding 130 the request with information on the access policy to a plurality of data provider devices, to instruct the plurality of data provider devices to provide the data to the requester device according to the access policy.

(25) A computer program having a program code for performing the method of (24), when the computer program is executed on a computer, a processor, or a programmable hardware component.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor, or other programmable hardware component. Thus, steps, operations, or processes of different ones of the methods described above may also be executed by programmed computers, processors, or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations, or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process, or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:
1. A query handler device for accessing data, the query handler device comprising:
at least one interface configured to communicate with a requester device and with a plurality of data provider devices; and
processing circuitry configured to:
obtain a request for data from the requester device, wherein the request includes a reference to a classification result, with the data being requested being relevant for machine learning with respect to the classification result, wherein the data being requested is at least one of a) sensor data or an abstraction of sensor data of at least one of an object, person, event, scene, activity, and act being classified, b) data relevant with respect to machine-learning and c) data relevant for classification, determine an access policy for the requester device based on a negotiation with the requester device, impose rate limiting on requests from the requester device, wherein the rate limiting refers to a scope of the requests per requester device across an index of possible classifications to prevent index building by the requester device, wherein the processing circuitry is configured to discard requests that violate the rate limiting to prevent the requester device from discovering which of the plurality of data provider devices have data according to different classifications, and forward the request with information on the access policy to the plurality of data provider devices, to instruct the plurality of data provider devices to provide the data to the requester device according to the access policy, wherein the data provider devices are configured to provide the data to the requester device without involving the query handler device such that the query handler device does not know which data provider devices provide data in response to the request.

2. The query handler device according to claim 1, wherein the processing circuitry is configured to obtain authentication information from the requester device, and to determine the access policy for the requester device based on the authentication information.

3. The query handler device according to claim 1, wherein the processing circuitry is configured to obtain information on a data processing policy of the requester device from the requester device, and to determine the access policy for the requester device based on the data processing policy of the requester device.

4. The query handler device according to claim 1, wherein the processing circuitry is configured to impose rate limiting on requests from requester devices, with the rate limiting being based on a number of requests per requester device in a pre-defined time interval.

5. A system comprising the query handler device according to claim 1 and the plurality of data provider devices, wherein each data provider device comprises:

at least one interface for communicating with the query handler device and for communicating with the requester device; and processing circuitry configured to:

obtain the forwarded request with the information on the access policy for the requester device, and provide, if the data requested is available at the data provider device and can be provided according to the access policy, the data to the requester device.

6. The system according to claim 5, wherein the processing circuitry of the data provider device is configured to provide the data to the requester device without involving the query handler device.

7. The system according to claim 6, wherein the at least one interface of the data provider device is further suitable for communicating with one or more data source devices, the processing circuitry of the data provider device being configured to obtain the data from the one or more data source devices.

8. The system according to claim 7, wherein the processing circuitry of the data provider device is configured to transform, decrypt or re-encrypt the data before providing the data to the requester device.

9. The system according to claim 7, wherein the processing circuitry of the data provider device is configured to obtain the data with information on a classification result with respect to the data, with the request including a reference to the classification result, and with the processing circuitry of the data provider device being configured to provide the data based on a match between the information on the classification result included within the data and the information on the classification result included in the request.

10. The system according to claim 7, further comprising a plurality of data source devices, wherein each data source device comprises:

at least one interface for communicating with at least one of the plurality of data provider devices; and processing circuitry configured to:

provide the data to the at least one data provider device.

11. The system according to claim 10, wherein the processing circuitry of the data source device is configured to process the data using a machine-learning model, determine a classification of the data based on an output of the machine-learning model, and to provide the data to the at least one data provider device with information on the classification.

12. The system according to claim 11, wherein the classification relates to at least one of an object, person, event, scene, activity and act being represented in the data, the at least one interface of the data source device being further suitable for communicating with one or more other data source devices, and the processing circuitry of the data source device being configured to coordinate the classification of the object, person, event, scene, activity or act with the one or more other data source devices using a privacy-preserving coordination mechanism.

13. The system according to claim 10, wherein the processing circuitry of the data source device is configured to request further data from the query handler device, and to train the machine-learning model based on the further data.

14. The system according to claim 10, wherein the processing circuitry of the data source device is configured to encrypt the data before providing the data to the at least one data provider device.

15. The system according to claim 10, wherein the at least one interface of the data source device being further suitable for communicating with at least one sensor of the data source device, with the processing circuitry of the data source device being configured to determine the data based on sensor data of the at least one sensor of the data source device.

16. A query handler method for accessing data, the query handler method comprising:

obtaining a request for data from a requester device, wherein the request includes a reference to a classification result, with the data being requested being relevant for machine learning with respect to the classification result;

wherein the data being requested is at least one of a) sensor data or an abstraction of sensor data of at least one of an object, person, event, scene, activity, and act being classified, b) data relevant with respect to machine-learning and c) data relevant for classification, determining an access policy for the requester device based on a negotiation with the requester device;

imposing rate limiting on requests from the requester device, wherein the rate limiting refers to a scope of the requests per requester device across an index of possible classifications to prevent index building by the requester device, wherein the processing circuitry is configured to discard requests that violate the rate limiting to prevent the requester device from discovering which of the plurality of data provider devices have data according to different classifications; and forwarding the request with information on the access policy to a plurality of data provider devices, to instruct the plurality of data provider devices to provide the data to the requester device according to the access policy, wherein the data provider devices are configured to provide the data to the requester device without involving the query handler device such that the query handler device does not know which data provider devices provide data in response to the request.

17. A non-transitory computer-readable storage medium storing computer-readable instructions thereon for performing the method of claim 16, when the computer-readable instructions are executed on a computer, a processor, or a programmable hardware component.

\* \* \* \* \*